United States Patent [19]
Fleming et al.

[11] Patent Number: 5,807,421
[45] Date of Patent: *Sep. 15, 1998

[54] HYDROMETALLURGICAL EXTRACTION PROCESS

[75] Inventors: Christopher Andrew Fleming, Peterborough, Canada; Walther Gustav Grot, Chadds Ford, Pa.; John Anton Thorpe, Germantown, Tenn.

[73] Assignee: E. I. du Pont de Nemours and Company, Wilmington, Del.

[ * ] Notice: The term of this patent shall not extend beyond the expiration date of Pat. No. 5,411,575.

[21] Appl. No.: 695,329

[22] Filed: Aug. 2, 1996

Related U.S. Application Data

[63] Continuation-in-part of Ser. No. 533,984, Sep. 26, 1995, Pat. No. 5,667,557, which is a continuation-in-part of Ser. No. 376,367, Jan. 23, 1995, abandoned, which is a continuation-in-part of Ser. No. 217,912, Mar. 25, 1994, Pat. No. 5,411,575.

[51] Int. Cl.$^6$ ............................. C22B 15/00; C22B 11/00
[52] U.S. Cl. .............................. 75/710; 75/711; 75/712; 75/743; 204/481
[58] Field of Search ............................. 75/710, 711, 712, 75/743; 204/481

[56] References Cited

U.S. PATENT DOCUMENTS

| | | | |
|---|---|---|---|
| 3,656,893 | 4/1972 | Sloan | 23/77 |
| 4,687,559 | 8/1987 | Coburn et al. | 204/110 |
| 5,411,575 | 5/1995 | Fleming et al. | 75/743 |

FOREIGN PATENT DOCUMENTS

| | | |
|---|---|---|
| 1221842 | 5/1987 | Canada . |
| 0135950 | 7/1984 | European Pat. Off. . |
| 1050303 | 12/1966 | United Kingdom . |
| 2242422 | 10/1991 | United Kingdom . |
| WO 92/08812 | 5/1992 | WIPO . |

OTHER PUBLICATIONS

Scerescini,B., "The Mt. Gibson Process", *AMMTEC Pty Ltd. Processing of Gold–Copper Ores (Practical Aspects)*, pp. 39–41, Jul. 4, 1991.

LaBrooy, S.R., "Copper–Gold Ore Treatment Options and Status", *Randol Gold Forum Vancouver '92, Randol International: Golden, CO*, pp. 173–177.

Muir,D.M. LaBrou,S.R., Fenton,K., "Processing Copper–Gold Ores with Ammonia or Ammonia–Cyanide Solutions", *World Gold '91, AusIMM: Victoria, Australia*, pp. 145–150.

*Primary Examiner*—Prince Willis, Jr.
*Assistant Examiner*—M. Alexandra Elve

[57] ABSTRACT

A hydrometallurgical process for treating copper feed materials containing gold and/or silver by simultaneously leaching copper, gold and/or silver into an aqueous cyanide solution, extracting copper, gold and cyanide with anion exchange resin is provided.

7 Claims, No Drawings ic EXTRACTION
HYDROMETALLURGICAL EXTRACTION PROCESS

CROSS REFERENCE TO RELATED APPLICATIONS

This application is a continuation-in-part of copending application Ser. No. 08/533,984, filed Sep. 26, 1995, which was a continuation-in-part of application Ser. No. 08/376,367, filed Jan. 23, 1995, now abandoned, which was a continuation-in-part of application Ser. No. 08/217,912, filed Mar. 25, 1994, now U.S. Pat. No. 5,411,575.

FIELD OF THE INVENTION

This invention is related to hydrometallurgical extraction processes and specifically to the extraction of copper either alone or in the presence of gold from processed ore by cyanide leaching to provide gold and copper or mixtures thereof for the metal purification step of the overall metallurgical process.

BACKGROUND ART

There are three major identifiable steps that follow the mining step in the process of obtaining pure metals and/or minerals from rock or ore. These three steps of the overall metallurgical process are mineral processing, metallurgical extraction and metal purification. Mineral processing itself is broken down into one of two steps: comminution and concentration. Metallurgical extraction can be either hydrometallurgical or pyrometallurgical while metal purification includes smelting, electrowinning or electrorefining of the product coming from the metallurgical extraction steps.

Gold ores containing high concentrations of cyanide-soluble copper minerals, e.g., chalcocite ($Cu_2S$), bornite ($FeS \cdot 2Cu_2S \cdot CuS$), malachite [$CuCO_3 \cdot Cu(OH)_2$], azurite [$2CuCO_3 \cdot Cu(OH)_2$], covellite ($CuS$) and cuprite ($Cu_2O$), have traditionally been difficult to treat economically, because of the high costs associated with cyanide consumption during leaching and cyanide destruction during effluent treatment. High concentrations of copper cyanide in the leach liquor can also cause a variety of metallurgical problems, whether gold is recovered by the Merrill-Crowe process, or by adsorption on activated carbon. Consequently, many gold resources that fall into this category are still lying in the ground, awaiting the development of adequate technology for their treatment.

Much research has gone into this problem over the years, and these efforts have generally focused in one of two directions: to develop other leaching chemistries for gold dissolution, i.e., lixiviants that are more selective than cyanide for gold over copper or to suppress the reaction between copper and cyanide by either physically or chemically masking the copper minerals. Neither approach has met with widespread success. This invention provides an efficient and cost effective process for treating gold ores containing high concentrations of cyanide-soluble copper minerals, as well as high copper bearing ores with negligible gold.

Hydrometallurgical extraction of copper and gold has been carried out previously by leaching the ore first with sulfuric acid to dissolve the copper minerals, followed by neutralization of the residual acid and finally by cyanidation to leach the gold. This approach does not work with the sulfide minerals such as chalcocite and bornite, which leach in cyanide solution but not in acid, is often uneconomic due to high acid, base or cyanide consumption, and prolonged leaching times required for two stages of leaching, and is often impractical because of physical changes brought about in the rock by acid treatment. An alternative approach is to leach with cyanide as described in U.S. Pat. No. 3,463,710. This patent discloses an aqueous alkaline cyanide leaching of copper ores followed by electrolyzing the separated solution to recover only a portion of the copper and recovering cyanide. This process, however, suffers from certain limitations; it utilizes low current density, requires high copper concentrations and leads to the oxidation of cyanide at the anode.

There is a need for a process for treating copper-bearing ores or concentrates containing gold by simultaneously leaching both metals, gold and copper, into an aqueous cyanide solution and extracting copper, gold and cyanide from the leach solution or pulp in an economically efficient process.

SUMMARY OF THE INVENTION

The process of this invention is a hydrometallurgical extraction process for treating ores, concentrates and alternative feed materials containing copper alone or combinations of gold, silver and copper comprising the steps of:

(a) treating said ores, concentrates or feed materials with an aqueous cyanide solution having a molar ratio of CN:Cu ratio of >3:1 thereby simultaneously leaching copper, gold and silver;

(b) contacting the resulting solution or pulp with an anion exchange resin thereby adsorbing copper cyanide at a CN:Cu ratio of <3:1 and gold cyanide, if present, onto the resin;

(c) separating the resin having copper cyanide and gold cyanide, if present, adsorbed thereon from the now depleted solution or pulp containing no copper, gold or cyanide;

(d) treating the loaded resin obtained in step (c) above with an eluant containing copper cyanide at a CN:Cu ratio of between 3.5:1 and 4:1 and a copper concentration of at least 10 grams/liter thereby partially eluting copper cyanide and gold cyanide, if present, from the resin and producing an eluate having a CN:Cu ratio of less than 4:1; and (e) electrowinning copper metal and gold metal, if present, from the eluate produced in step (d).

The eluted resin obtained in step (d) of the above process can be treated with an acid to precipitate CuCN in the pores of the resin thus regenerating resin in a form useful in step (b) of the process.

Gold and/or silver can be recovered at various points in the hydrometallurgical extraction process of this invention.

DETAILED DESCRIPTION OF THE INVENTION

The process of this invention can be broadly described as treating copper ores or concentrates optionally containing gold and/or silver or any other materials containing copper alone or copper with gold and/or silver (hereinafter collectively referred to as copper feed materials or feed materials) in a hydrometallurgical process by simultaneously leaching copper, gold and/or silver into an aqueous cyanide solution and then extracting copper, gold and/or silver and cyanide from the leach solution or pulp. This process is capable of recovering gold, silver and copper from feed materials containing low concentrations of these metals and, therefore, can help eliminate the flotation step in the conventional process for treating sulfidic copper and copper/gold/silver ores. (References to gold hereafter can mean gold and/or silver.)

To obtain high leaching efficiency for both copper and gold there is a process of this invention of leaching feed materials with a cyanide solution (having a CN:Cu ratio of >3).

CN:Cu ratio is defined as the number of moles of $(CN)^-$ complexed with each mole of $Cu^+$ in a solution plus the number of free $(CN)^-$ ions not complexed with another metal or hydrogen ion per mole of $Cu^+$ in the solution.

One approach to obtaining gold from a pregnant leach solution is by cementation of gold on copper metal comprising the steps of:

(a) contacting a solution containing gold cyanide and copper cyanide wherein the CN:Cu ratio is not less than 3.5:1 with either copper metal powder or copper metal which has been electrodeposited on a high surface area cathode thereby producing a cemented product of gold metal on copper metal; and (b) recovering gold from the cemented product by electrorefining or smelting.

Another approach to obtaining gold from a pregnant leach solution or pulp is by adsorption of gold on activated carbon comprising the steps of:

(a) contacting a solution or pulp containing gold cyanide and copper cyanide wherein the CN:Cu ratio is not less than 3.5:1 with activated carbon;

(b) separating the activated carbon having gold cyanide adsorbed thereon from the now gold-depleted solution or pulp;

(c) treating the activated carbon having gold cyanide adsorbed thereon with an aqueous cyanide solution at a temperature of not less than 100° C.; and (d) recovering gold from the eluate by electrowinning.

After the leaching and gold extraction steps described above, the hydrometallurgical extraction processes of this invention are applied to the recovery processes for copper and optionally gold and to purge unwanted species from solution.

The process for the recovery of copper and cyanide from a solution or pulp containing copper cyanide (optionally containing gold) whereby copper, cyanide and gold, if present, are preconcentrated by adsorption on a strong base or weak base anion exchange resin comprises the steps of:

(a) contacting the solution or pulp with an anion exchange resin thereby adsorbing copper cyanide at a CN:Cu ratio of <3:1 and gold cyanide, if present, onto the resin;

(b) separating the resin having copper cyanide and gold cyanide, if present, adsorbed thereon from the now depleted solution or pulp containing no copper, gold or cyanide;

(c) treating the loaded resin obtained in step (b) above with an eluant containing copper cyanide at CN:Cu ratios of $\geq 3.5:1$ and a copper concentration of at least 10 grams/liter (this copper concentration being such that the subsequent electrowinning step can be operated at a maximum current efficiency) thereby eluting copper cyanide from the resin to the extent of approximately 50% of the copper on the resin and partially eluting gold cyanide, if present, and producing a partially eluted resin and an eluate solution having a CN:Cu ratio of less than 4:1; and (d) electrowinning copper metal and gold metal, if present, from the eluate produced in step (c) above.

Copper and gold can be electrowon on stainless steel cathodes which become anodes in an electrorefining step. Electrowinning is defined as the deposition of a metal on a cathode from a solution of the metal in the form of a metal salt.

The anion exchange resin useful in the process of this invention can be any strong or weak base resin in the chloride or any other counter anion form having CuCN precipitated within its pores, referred to as the regenerated resin. This latter form can be prepared from the partially eluted resin produced in step (c) above by treating it with an acid. Useful acids for this treatment include $H_2SO_4$ and HCl.

In the course of this acid treatment, HCN is also produced which can be recovered and reused in the leaching step of this invention. Cyanide recovery can be carried out by separating the regenerated resin from HCN followed by an alkali treatment of HCN to regenerate $CN^-$ ions.

The process of this invention also allows for the purging of unwanted moieties ($OCN^-$, $SCN^-$, $Cl^-$, $SO_4^{2-}$, $Fe(CN)_6^{4-}$, etc.) in the barren solution or pulp while retaining gold, copper and cyanide.

Because the regenerated resin utilized in this invention is capable of extracting cyanide ions from solution or pulp containing very little or no copper at all, the process of this invention can be utilized in circumstances where very high CN:Cu ratios are advantageous in the leaching process. Regenerated resin can also be utilized for the treatment of waste streams containing cyanide ions and no copper by extracting substantially all cyanide ions into the resin followed by acid treatment of the resin to produce regenerated resin and concentrated aqueous HCN for recycling and reuse.

In those situations where the CN:Cu ratio in the leach solution or pulp is >3:1, it is advantageous to contact the solution or pulp with regenerated resin in two stages of extraction. In the first stage, the regenerated resin can extract free cyanide, thereby reducing the CN:Cu ratio to approximately 3:1. This resin can be treated directly with acid to again regenerate the resin and to produce HCN. In the second stage, regenerated resin can extract copper and cyanide now present in the solution at a CN:Cu ratio of 3:1. This loaded resin can then be treated with the eluant containing copper cyanide at the CN:Cu ratio of $\geq 3.5:1$ as described above.

We claim:

1. A hydrometallurgical extraction process for treating copper feed materials comprising the steps of:

(a) treating said feed materials with an aqueous cyanide solution having a molar ratio of CN:Cu of >3 thereby simultaneously leaching copper and gold;

(b) optionally removing and recovering substantially all gold, if present, from the pregnant leach solution or pulp;

(c) contacting the resulting solution or pulp with an anion exchange resin thereby adsorbing copper cyanide at a CN:Cu ratio of <3:1 and gold cyanide, if present, onto the resin;

(d) separating the resin having copper cyanide and gold cyanide, if present, adsorbed thereon from the now depleted solution or pulp containing no copper, gold or cyanide;

(e) treating the loaded resin obtained in step (d) above with an eluant containing copper cyanide at a CN:Cu ratio of between 3.5:1 and 4:1 and a copper concentration of at least 10 grams/liter thereby partially eluting copper cyanide and gold cyanide, if present, from the resin and producing an eluate having a CN:Cu ratio of less than 4:1; and (f) electrowinning copper metal and gold metal, if present, from the eluate produced in step (e).

2. The process of claim 1 wherein the eluted resin obtained in step (e) is converted to a form suitable for use in step (c) by treating the eluted resin with acid thereby precipitating CuCN in the pores of the resin.

3. The process of claim 1 wherein electrowinning of copper is carried out by (a) passing the eluate as the catholyte through a compartment containing the cathode(s);

(b) plating copper metal and gold metal, if present, on the surface of the cathode(s) in an electrowinning cell wherein the anode(s) are optionally kept isolated from the catholyte by a cation exchange membrane thereby preventing anodic oxidation of cyanide ions; and (c) recovering copper from the cathode(s) by stripping the cathode surfaces or by smelting and gold, if present, by electrorefining.

4. The process of claim 1 wherein said pregnant leach solution or pulp resulting from step (b) is treated in a process comprising the steps of:

(a) treating the solution or pulp with regenerated resin thereby reducing the CN:Cu ratio to approximately 3:1;

(b) separating the resin from the now partially CN-depleted solution or pulp; and (c) processing the resulting solution or pulp according to steps (c)–(f) of claim 1.

5. The process of claim 4 wherein the resin obtained in step (b), containing free cyanide, is treated with acid to produce regenerated resin useful in step (a).

6. A process of treating waste streams containing cyanide ions but little or no copper comprising the steps of:

(a) treating said streams with regenerated resin thereby extracting substantially all cyanide ions;

(b) separating the resin from the now CN-depleted solution; and (c) treating the resin with acid to produce regenerated resin.

7. The process of claim 1 wherein the electrowinning of copper is carried out by:

(a) passing the eluate as the catholyte through a compartment containing the cathode(s);

(b) plating copper metal on the surface of the cathode(s) in an electrowinning cell wherein the anode(s) are kept isolated from the catholyte by a cation exchange membrane thereby preventing anodic oxidation of cyanide ions; and (c) recovering copper from the cathode(s) by stripping from the cathode surfaces or by smelting.

* * * * *